United States Patent
Honjo et al.

(10) Patent No.: US 9,342,738 B2
(45) Date of Patent: May 17, 2016

(54) IMAGE PROCESSING TO IMPROVE PHYSIQUE OF IMAGED SUBJECT

(71) Applicant: CASIO COMPUTER CO., LTD., Tokyo (JP)

(72) Inventors: Taichi Honjo, Tokyo (JP); Taiga Murayama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/575,073

(22) Filed: Dec. 18, 2014

(65) Prior Publication Data
US 2015/0186741 A1  Jul. 2, 2015

(30) Foreign Application Priority Data
Dec. 26, 2013  (JP) .................................. 2013-268220

(51) Int. Cl.
G06K 9/46  (2006.01)
G06K 9/00  (2006.01)
G06K 9/52  (2006.01)
G06T 11/00  (2006.01)

(52) U.S. Cl.
CPC .............. *G06K 9/00362* (2013.01); *G06K 9/52* (2013.01); *G06T 11/00* (2013.01); *G06T 2210/16* (2013.01)

(58) Field of Classification Search
None
See application file for complete search history.

(56) References Cited

U.S. PATENT DOCUMENTS

| | | | | |
|---|---|---|---|---|
| 2008/0112648 | A1* | 5/2008 | Hatano | G06K 9/00228 382/298 |
| 2009/0316022 | A1 | 12/2009 | Hatano | |
| 2011/0019029 | A1 | 1/2011 | Matsumoto et al. | |
| 2013/0329985 | A1* | 12/2013 | Helin | H04N 13/0011 382/154 |
| 2015/0003690 | A1* | 1/2015 | Masuko | G06T 3/40 382/111 |

FOREIGN PATENT DOCUMENTS

| | | |
|---|---|---|
| JP | 2008-123086 A | 5/2008 |
| JP | 2010-3251 A | 1/2010 |
| JP | 2010-056726 A | 3/2010 |
| JP | 2011-44132 A | 3/2011 |
| JP | 2011-76596 A | 4/2011 |
| JP | 2012-191641 A | 10/2012 |
| JP | 2013-162451 A | 8/2013 |

OTHER PUBLICATIONS

Japanese Office Action dated Nov. 4, 2015, in a counterpart Japanese patent application No. 2013-268220.

* cited by examiner

*Primary Examiner* — Brian P Werner
(74) *Attorney, Agent, or Firm* — Chen Yoshimura LLP (57) ABSTRACT

According to the imaging device, the control unit divides the subject in the photographed image into a plurality of regions, corrects the sizes of the respective regions such that a ratio of vertical width to horizontal width of the respective divided regions and ratios of sizes between the respective reaches match prescribed target ratios. The control unit then generates a region-optimized image by connecting the plurality of corrected regions.

18 Claims, 8 Drawing Sheets

|  | Vertical Width | Horizontal Width |
|---|---|---|
| Face | 1 | 0.8 |
| Upper Body | 2.5 | 2 |
| Lower Body | 4.5 | 1.5 |

FIG. 2A

|  | Vertical Width | Horizontal Width |
|---|---|---|
| Face | 1 | 0.8 |
| Torso | 7 | 1.8 |

IMAGE PROCESSING TO IMPROVE PHYSIQUE OF IMAGED SUBJECT

BACKGROUND OF THE INVENTION

1. Technical Field

The present invention relates to an image processing device, a method of processing an image, and a program.

2. Background Art

Conventionally, a technique of imaging processing in order to make the skin of the face region in a photographed image more beautiful is known.

Patent Document 1 discloses a technique in which the degree of shine on a face in a photographed image is detected and corrected, for example.

RELATED ART DOCUMENT

Patent Document

Patent Document 1: Japanese Patent Application Laid-Open Publication No. 2011-44132.

SUMMARY OF THE INVENTION

Conventionally, however, the physique of the subject in the photographed image was unchanged, despite the face being corrected, which made it impossible to achieve an image showing an ideal physique of the subject, such as the physique of a model, for example.

An aim of the present invention is to be able to provide an image in which the physique of the subject in the photographed image is an ideal physique.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an image processing device, including a control unit configured to: receive a photographed image; divide a subject in the photographed image into a plurality of regions; correct a size of each of the divided regions such that a ratio of vertical width to horizontal width in each of the regions and ratios of areas between the divided regions respectively match corresponding prescribed target ratios; and connect the divided regions, the sizes of which have been corrected.

In another aspect, the present disclosure provides a method of processing an image, including: dividing a subject in a photographed image into a plurality of regions; correcting a size of each of the divided regions such that a ratio of vertical width to horizontal width in each of the regions and ratios of areas between the divided regions respectively match corresponding prescribed target ratios; and connecting the corrected regions, the sizes of which have been corrected.

In another aspect, the present disclosure provides a non-transitory storage medium that stores instructions executable by a computer, the instructions causing the computer to perform the following: divide a subject in a photographed image into a plurality of regions; correct a size of each of the divided regions such that a ratio of vertical width to horizontal width in each of the regions and ratios of areas between the divided regions respectively match corresponding prescribed target ratios; and connect the corrected regions, the sizes of which have been corrected.

The present invention makes it possible to provide an image in which the physique of the subject in the photographed image has become an ideal physique.

It is to be understood that both the foregoing general description and the following detailed description are exemplary and explanatory, and are intended to provide further explanation of the invention as claimed.

DETAILED DESCRIPTION OF EMBODIMENTS

Preferable embodiments of respective aspects of the present invention will be described in detail below with reference to the attached drawings. The present invention is not limited to the examples shown in the drawings.

Configuration of Imaging Device 1

Figure 1:
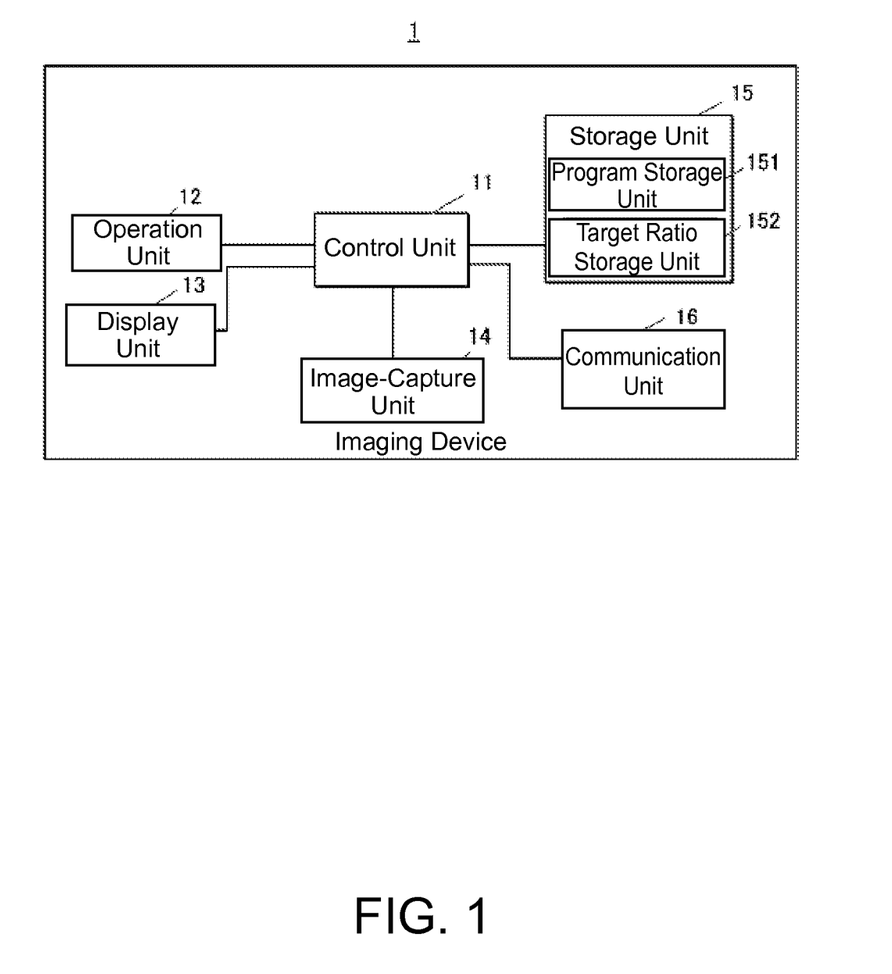
FIG. 1 is a view of the entire configuration of an imaging device in the present embodiment.

FIG. 1 is a block view of the primary control configuration of an imaging device 1, which is an image processing device of the present embodiment.

As shown in FIG. 1, the imaging device 1 includes a control unit 11, an operation unit 12, a display unit 13, an image-capture unit 14, a storage unit 15, a communication unit 16, and the like. As shown in FIG. 1, the operation unit 12, the display unit 13, the image-capture unit 14, the storage unit 15, and the communication unit 16 are connected to the control unit 11.

The control unit 11 has a CPU (central processing unit) that runs various types of programs stored in the storage unit 15 for controlling prescribed computations and units, and a memory that serves as the work area when the programs are being run (neither is shown). The control unit 11 functions as a region dividing unit, a correcting unit, a connecting unit, a processing level calculation unit, a compositing unit, and an interpolating unit, in cooperation with programs stored in a program storage unit 151 of the storage unit 15.

The operation unit 12 is constituted of a power source, shutter key, various types of function keys, various types of mode keys, and the like, and outputs operational signals corresponding to respective operation of the keys to the control unit 11. The respective mode keys include a model mode key for instructing a transition to model mode, in which the region-optimized image generation process is executed, as described later. The model mode is a mode for correcting the respective regions of the subject in the photographed image to achieve an ideal physique, such as that of a model.

The display unit 13 is constituted of a display panel such as a liquid crystal display panel or an EL display panel and displays various types of screens such as live-view screens for displaying operating screens and images that are being photographed. The display unit 13 displays these screens in accordance with instructions from the control unit 11.

The image-capture unit 14 is an imaging device constituted of an optical lens unit, an image sensor or the like such as a CCD (charge coupled device) or CMOS (complementary metal-oxide semiconductor), an A/D converter circuit substrate, and the like. The image-capture unit converts optical images that have passed through the optical system into two-dimensional image signals in order to obtain image data from a photographic image.

The storage unit 15 is constituted of an HDD (hard drive disk), non-volatile semiconductor memory, or the like. As shown in FIG. 1, the storage unit 15 has the program storage unit 151 and a target ratio storage unit 152.

The program storage unit 151 stores various types of programs executed by the control unit 11 and the necessary data and the like for executing these programs.

Figure 2A:
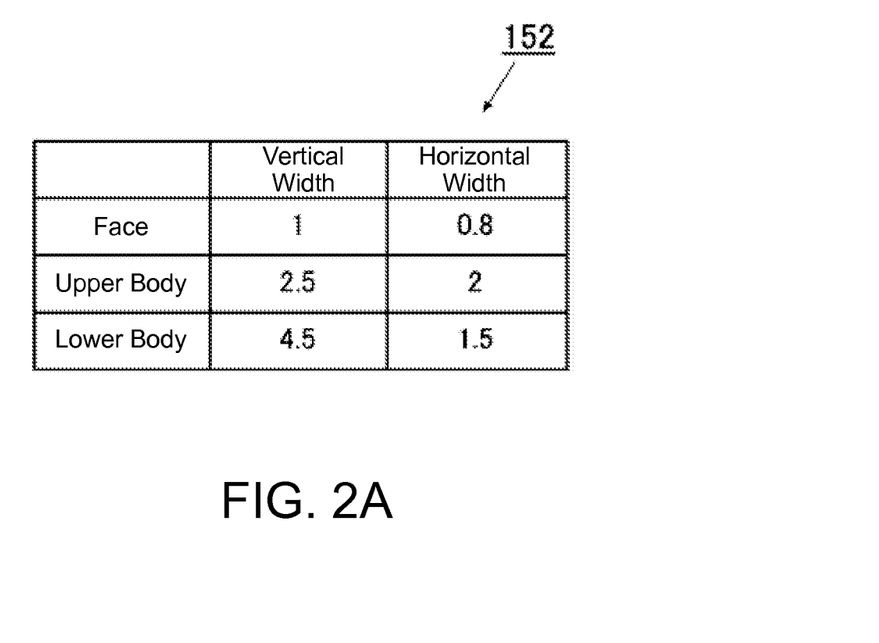
FIG. 2A is a view of data storage rows in the target ratio storage unit in FIG. 1.
Figure 2B:
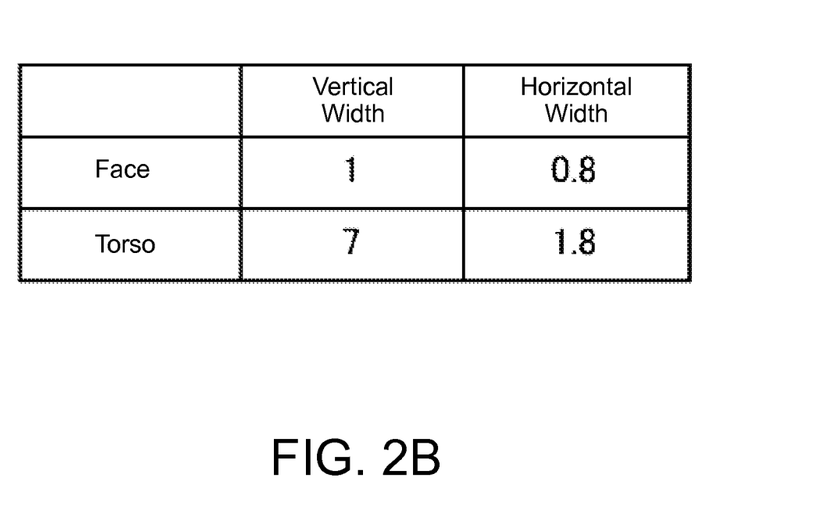
FIG. 2B is a view of data storage rows in the target ratio storage unit in FIG. 1.

The target ratio storage unit 152 stores a ratio of vertical width to horizontal width for each region of a target physique (an ideally balanced physique, such as that of a model, for example) and ratios of sizes between these regions. As shown in FIG. 2A, under the assumption that the human body has been divided into a face region, an upper body region, and a lower body region, and that the vertical width of the face region is 1, the target ratio storage unit 152 stores a ratio for the ideal horizontal width for the face region, the ideal vertical width to horizontal width for the upper body region, and the ideal vertical width to horizontal width for the lower body region, for example. As shown in FIG. 2B, under the assumption that the human body has been divided into a face region and a torso region, and that the vertical width of the face region is 1, the target ratio storage unit 152 stores a ratio for the ideal horizontal width for the face region, the ideal vertical width to horizontal width for the upper body region, and the ideal vertical width to horizontal width for the lower body region, for example.

In the present embodiment, the horizontal width of the face region is the horizontal width at the center of the face, the horizontal width of the upper body is the shoulder width, the horizontal width of the lower body is the width of the boundary with the upper body, and the horizontal width of the torso region is the shoulder width. The vertical width is the length of a vertical line in the center of the respective extracted regions.

The communication unit 16 communicates with an external device and sends/receives data. The connection with the external device may be a wireless connection using LAN (local area network), Bluetooth (registered trademark), or the like, for example, or may be a wired connection using a USB (universal serial bus) cable or the like, for example; however, there are no particular limitations to the communication mode.

Operation of Imaging Device 1

Next, the operation of the imaging device 1 will be explained.

Figure 3:
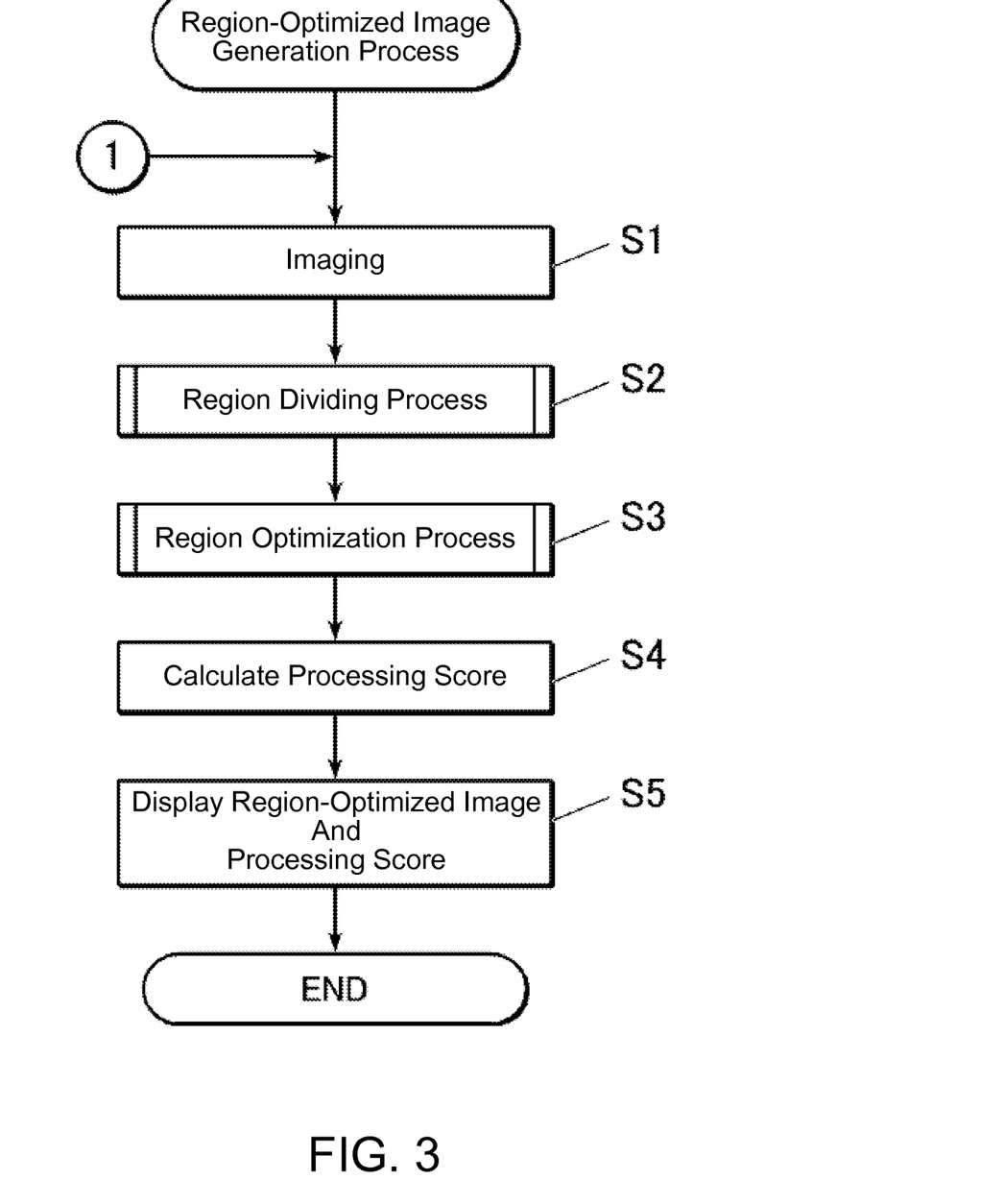
FIG. 3 is a flow chart of a region-optimized image generation process executed by the control unit in FIG. 1.

FIG. 3 shows a flow chart of the region-optimized image generation process executed by the imaging device 1. The region-optimized image generation process is executed in cooperation with the control unit 11 and a program stored in the program storage unit 151 when the model mode key of the operation unit 12 has been pressed.

First, the control unit 11 performs imaging in accordance with operation of the operation unit 12 (step S1). In other words, pressing the shutter key of the operation unit 12 causes the image data of the subject captured by the imaging unit 14 to be stored in a photographed image storage region in the memory.

Next, the control unit 11 runs a region dividing process on the photographed image that has been obtained by the imaging (step S2).

Figure 4:
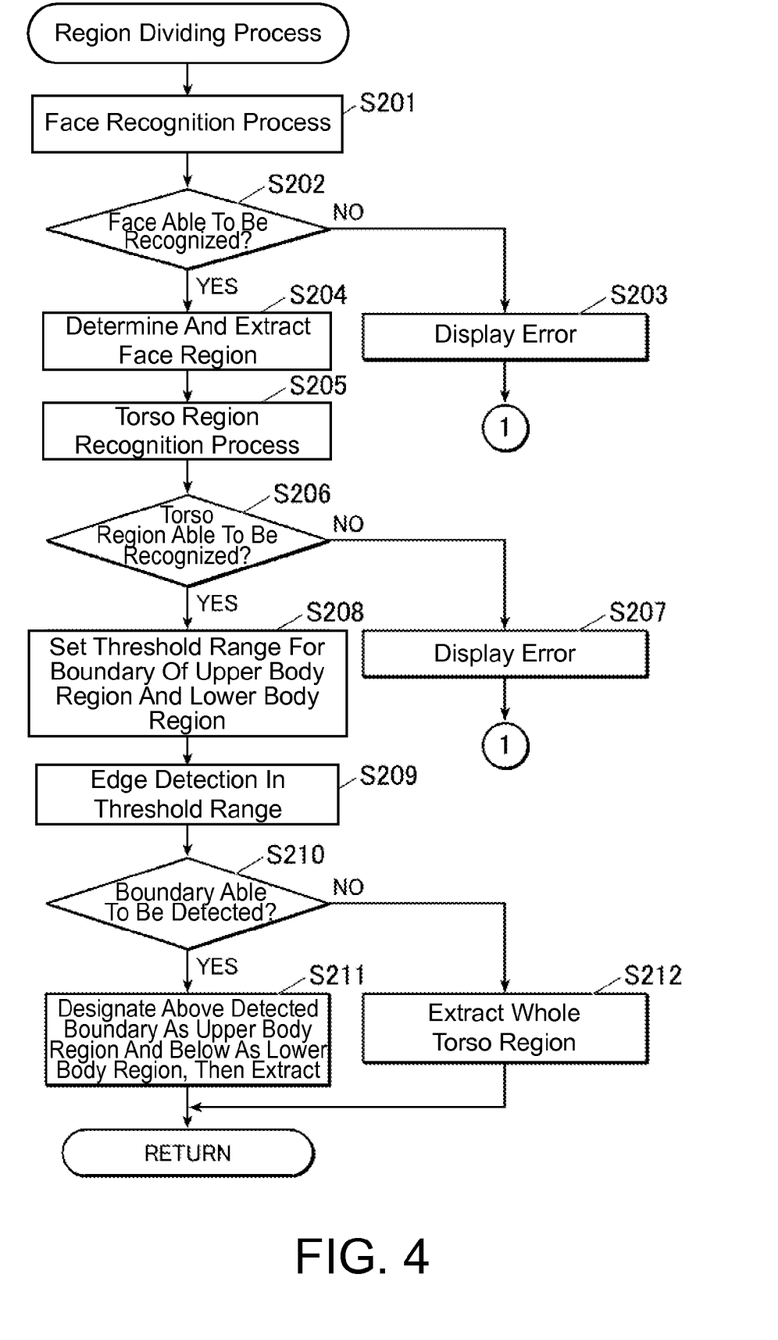
FIG. 4 is a flow chart of a region division process executed in step S2 in FIG. 3.

FIG. 4 shows a flow chart of the region dividing process executed in step S2 in FIG. 3. The region dividing process is run through cooperation with the control unit 11 and the programs stored in the program storage section 151.

In the region dividing process, first, the control unit 11 runs a facial recognition process on the photographed image that has been obtained by the imaging (step S201). A well-known image processing technique based on facial traits such as the eyes, nose, and mouth is used to recognize a face in the photographed image, for example.

Next, on the basis of the results from the facial recognition process, the control unit 11 determines whether or not a face can be recognized in the photographed image (step S202). If it is determined that a face cannot be recognized in the photographed image (NO in step S202), the control unit 11 causes an error message to be displayed on the display unit 13 (step S203) and returns to step S1 in FIG. 3.

In step S203, the control unit 11 causes an error message, such as "No face could be recognized. Please retake the picture of the person," for example, to be displayed on the display unit 13.

Figure 5:
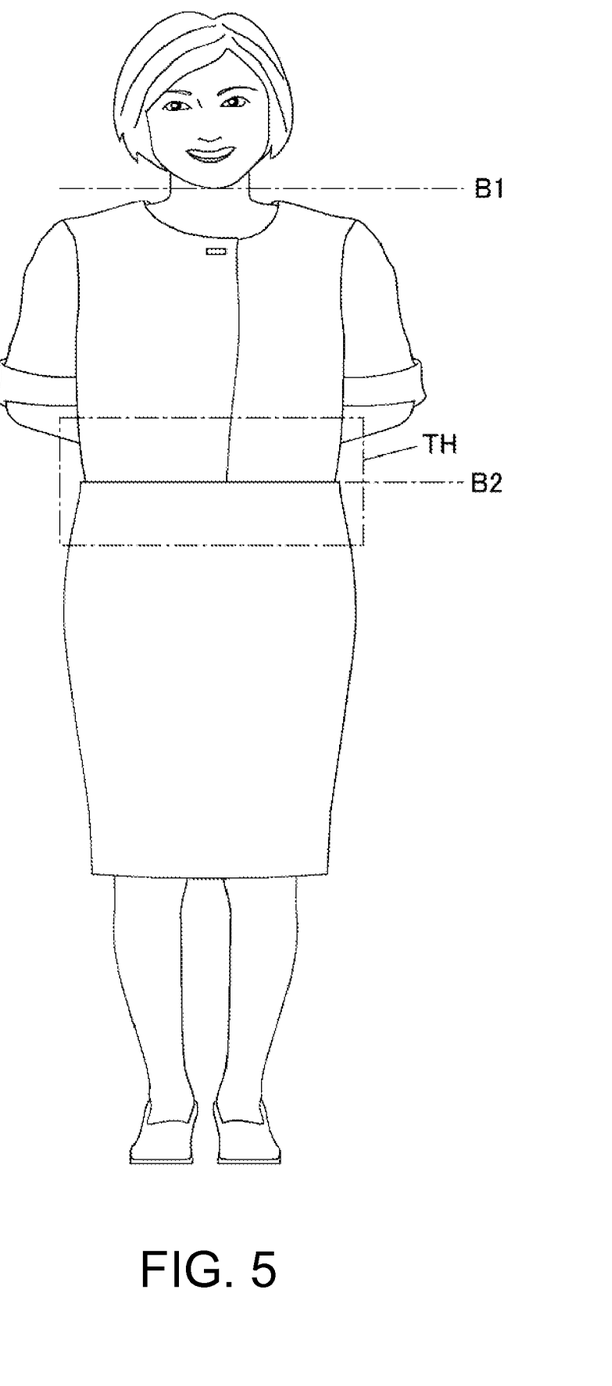
FIG. 5 is a view of threshold ranges of the bottom of the face region, the upper body region, the lower body region, and the boundaries of the upper body region and the lower body region.

In step S202, if it is determined that a face can be recognized in the photographed image (YES in step S202), the control unit 11 chooses and extracts a face region in the photographed image (step S204). Specifically, as shown in FIG. 5, the region above a tangent line B1 on the bottom end of the recognized face region is chosen as the face region.

Next, the control unit 11 performs a torso region recognition process on the photographed image (step S205). The recognition of the torso region may be performed using a well-known technique or any well-known image processing technique. Edge detection or the like, for example, is performed on the bottom of the face region that has been recognized in the photographed image, and recognition of the entire torso region is performed on the basis of a ratio or the like of the obtained outline or shape to the vertical length of the face region.

Next, on the basis of the processing results in the torso region recognition process, the control unit 11 determines whether or not a torso region has been recognized (step S206). If it is determined that a torso region cannot be recognized in the photographed image (NO in step S206), the control unit 11 causes an error message to be displayed on the display unit 13 (step S207) and returns to the process in step S1 in FIG. 3.

In step S207, the control unit 11 causes an error message, such as "No body could be recognized. Please retake the picture of the body," for example, to be displayed on the display unit 13.

If it is determined that a torso region can be recognized in the photographed image (YES in step S206), the control unit 11 sets a threshold range TH that is presumed to include a boundary B2 of the upper body region and the lower body region (step S208). If the length (vertical width) of a face is 1 (i.e., the reference), the length (vertical width) of a normal upper body differs depending on the person, but is approximately 1.8 to 2.8, for example. The threshold range TH that is presumed to include the boundary of the upper body and the lower body is set on the basis of this range that includes the boundary of a normal upper body and lower body. As shown in FIG. 5, a range within 1.8× to 2.8× the length of the face in the vertical direction from the top of the torso region is set as the threshold range TH, for example.

Next, the control unit 11 performs edge detection in the set threshold range TH to detect the boundary line of clothes dividing the torso region into top and bottom (step S209). In the present embodiment, the location of the boundary line of these clothes is set as the boundary B2 of the upper body region and the lower body region of the torso region in the photographed image. Dividing the upper body region and lower body region on the basis of a boundary of clothes ensures that a particular region having different clothes is not divided when the region optimization process is performed for each region, as described later. If the results of edge detection indicate that edges are aligned substantially in the left-right direction of the body in the threshold range TH, for example, then the line that is connecting these edges is detected as the boundary line of clothes dividing the torso region into top and bottom. A boundary line is not detected if the subject is wearing clothes where top and bottom are connected to each other, such as a dress, for example.

If the processing results of step S209 indicate that the boundary B2 was able to be detected (YES in step S210), the control unit 11 sets the region above the detected boundary B2 as the upper body region and the region below the boundary B2 as the lower body region, and then individually extracts these (step S211). The control unit 11 then transitions to the process in step S3 in FIG. 3. In other words, the subject is divided into three regions: a face region, an upper body region, and a lower body region. The top of the upper body region is the tangent line B1 described above.

On the other hand, if the processing results of step S209 indicate that the boundary B2 was unable to be detected (NO in step S210), then the control unit 11 extracts the torso region as a whole (step S212) and transitions to the process in step S3 in FIG. 3. In other words, the subject is divided into two regions: a face region, and a torso region. The top of the upper body region is the tangent line B1 described above.

In step S3 in FIG. 3, the control unit 11 runs the region optimization process (step S3).

Figure 6:
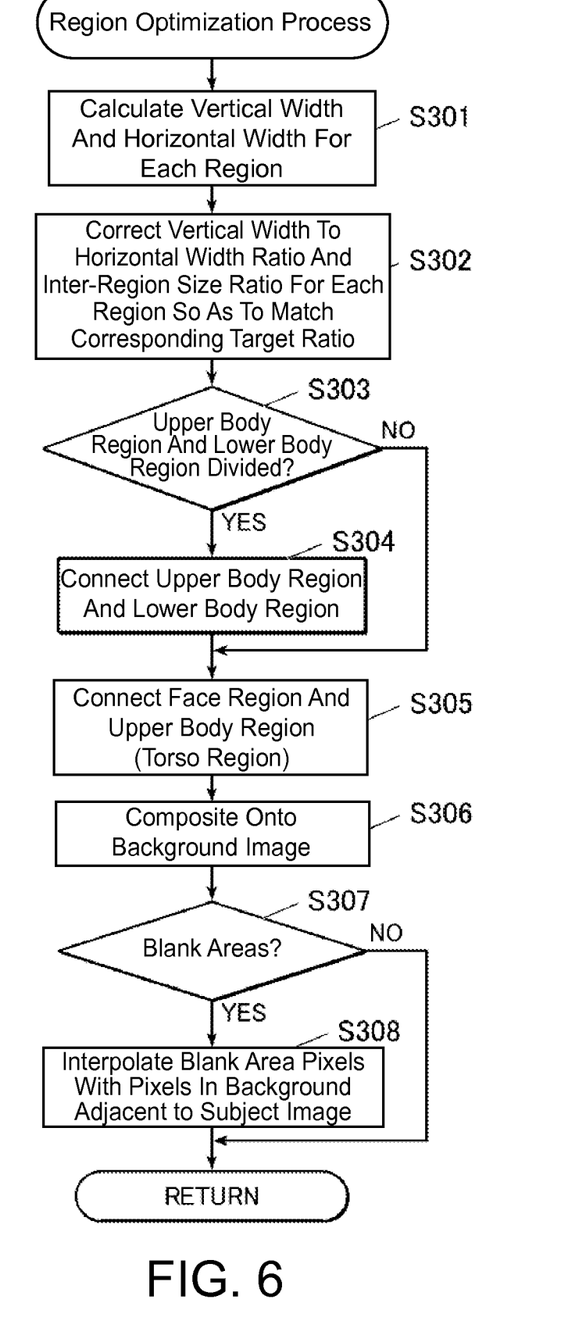
FIG. 6 is a flow chart of the region optimization process executed in step S3 in FIG. 3.

FIG. 6 shows a flow chart of the region optimization process executed in step S3 in FIG. 3. The region optimization process is run through cooperation with the control unit 11 and the programs stored in the program storage section 151.

In the region optimization process, the control unit 11 first calculates a vertical width and a horizontal width for the face region, the upper body region and the lower body region (or the torso region), respectively (step S301). As described above, the horizontal width of the face region is the horizontal width at the center of the face, the horizontal width of the upper body is the shoulder width, the horizontal width of the lower body is the width of the boundary with the upper body, and the horizontal width of the torso region is the shoulder width. The vertical width is the length of a vertical line in the center of the respective extracted regions.

Next, the control unit 11 reads out the target ratios stored in the target ratio storage unit 152 of the storage unit 15 indicating the vertical width to horizontal width of the respective regions when the vertical width of the face is set as 1 (i.e., the reference), and corrects the size of the respective regions such that the ratio of the vertical width to horizontal width in these respective regions and the ratio of the sizes between the respective regions become the corresponding target ratios (step S302). Specifically, the vertical width and/or horizontal width of the respective regions are enlarged or shrunk in accordance with the corresponding target ratios.

Next, the control unit 11 determines whether or not the upper body region and the lower body region have been divided (step S303). If it is determined that the upper body region and the lower body region have not been divided (NO in step S303), then the control unit 11 transitions to the process in step S305.

If it is determined that the upper body region and the lower body region have been divided (YES in step S303), then the control unit 11 connects the upper body region to the lower body region (step S304), and then transitions to the process in step S305.

Figure 7A:
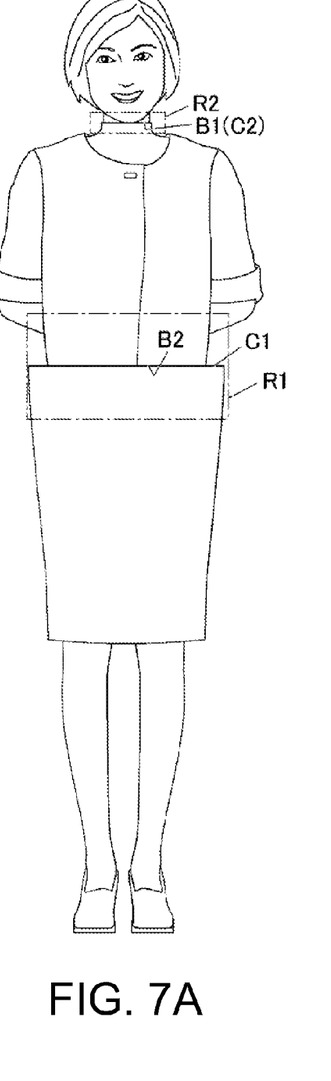
FIG. 7A is a view for explaining the connecting of the regions.
Figure 7B:
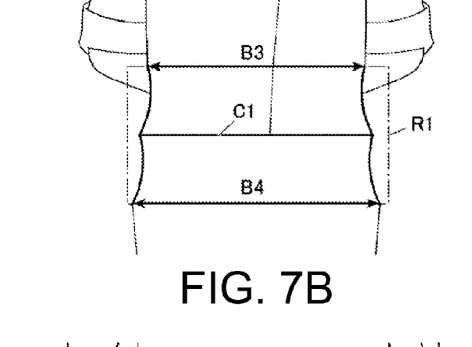
FIG. 7B is a view for explaining the connecting of the regions.

In step S304, the control unit 11 connects the bottom of the upper body region to the top of the lower body region. As shown in FIG. 7A, the control unit 11 sets a connected region R1 (first connected region) as a region within a prescribed vertical range from a reference location of the connecting area (boundary B2) of the upper body region and the lower body region, and as shown in FIG. 7B, corrects the profile shape of the connected region R1 such that the length of a center C1 (substantially coinciding with B2 in FIG. 7A) in the vertical direction of the connected region R1 becomes an average value of a length B3 of the top of the connected region R1 and a length B4 of the bottom of the connected region R1. In this case, the reference location of the connecting area (boundary B2) of the upper body region and the lower body region is located in the center of the vertical direction of the boundary B2, for example. If the boundary B2 is a linear line or the like in a purely horizontal direction with no deviations in the vertical direction, then the boundary B2 itself is the reference location.

In FIGS. 7A to 7D, the reference characters R1 and R2 are added onto rectangles having the respective connected regions R1 and R2 in order to make it easier to understand the configuration of the connected regions R1 and R2, but the actual connected regions R1 and R2 are within the range of the respective regions of the subject and do not include regions outside of the subject.

Specifically, as shown in FIG. 7B, the control unit 11 sets the horizontal length of the center C1 of the connected region R1 as the average value of the length B3 on top of the connected region R1 and the length B4 on the bottom, and sets both left-right ends of the center C1 as reference points. Under these parameters, the control unit 11 corrects the outline shape of the left-right sides of the connected region R1 such that respective quadratic curves are drawn from the reference points to the top on the corresponding left-right sides (the same sides as the respective reference points) of the connected region R1 and to the bottom on the corresponding left-right sides (the same sides as the respective reference points) of the connected region R1. The ends of the center C1 are also corrected so as to be smooth.

In one preferable aspect of the present invention, the length of the center C1 is corrected so as to be the average value of B3 and B4, but the present invention is not limited to this, and the length of the center C1 may be a value in-between the length of B3 and the length of B4.

Next, the control unit 11 connects the face region to the upper body region (or the torso region) (step S305).

Figure 7C:
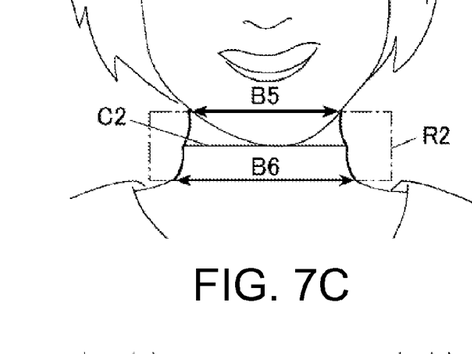
FIG. 7C is a view for explaining the connecting of the regions.

As shown in FIG. 7A, the control unit connects the bottom of the face region to the top of the upper body region (or torso region). As also shown in FIG. 7A, the control unit 11 sets a connected region R2 (second connected region) as a region within a prescribed vertical range from a reference location (the top of the vertical range being the length from the reference location to the neck joints, the bottom being the same length as the top from the reference location) of the connecting area (boundary B1) of the face region and the upper body region (or torso region). As shown in FIG. 7C, under these parameters, the control unit 11 corrects the outline shape of the connected region R2 such that the length of a center C2 (substantially coinciding with B1 in the drawing) in the vertical direction of the connected region R2 becomes an average value of a length B5 of the top of the connected region R2 and a length B6 of the bottom of the connected region R2. In this case, the boundary B1 is a linear line or the like in a purely horizontal direction with no deviations in the vertical direction, and thus the boundary B2 itself is the reference location.

Specifically, the control unit 11 sets the horizontal length of the center C2 of the connected region R2 as the average value of the length B5 on top of the connected region R2 and the length B6 on the bottom, and sets both left-right ends of the center C2 as reference points. Under these parameters, the control unit 11 corrects the outline shape of the left-right sides of the connected region R2 such that respective quadratic curves are drawn from the reference points to the neck joints on the corresponding left-right sides (the same sides as the respective reference points) of the face region and to the bottom on the corresponding left-right sides (the same sides as the respective reference points) of the connected region R2. The ends of the center C2 are also corrected so as to be smooth.

In one preferable aspect of the present invention, the length of the center C2 is corrected so as to be the average value of B5 and B6, but the present invention is not limited to this, and the length of the center C2 may be a value in-between the length of B5 and the length of B6.

Figure 7D:
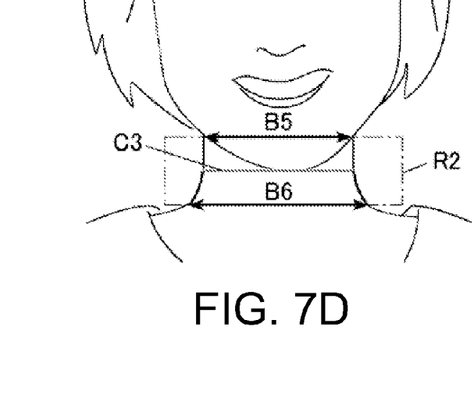
FIG. 7D is a view for explaining the connecting of the regions.

As shown in FIG. 7D, as another example of step S305, the face region may remain unchanged, and only the outline of the upper body region (or torso region) of the connected region R2 may be corrected. The control unit 11 corrects both left-right sides of the connected region R2, for example, such that respective quadratic curves are drawn from the left-right ends of a bottom side C3 of the face region to the bottom of the corresponding left-right sides of the connected region R2. In other words, the connection between the neck and the head in a normal human body is substantially linear, whereas the connection of the neck and torso is smooth such that respective quadratic curves are drawn between the torso and shoulders; thus, in this manner, there is no correction by quadratic curves on the neck portion of the face region, thereby making it possible to connect the face region to the upper body region more naturally.

Figure 8:
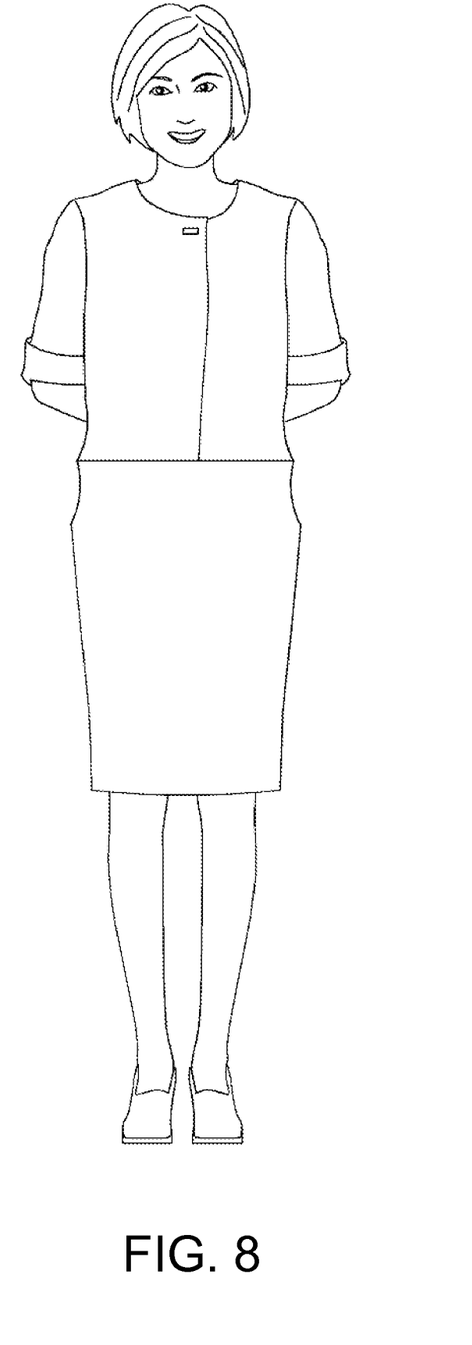
FIG. 8 is one example of an image in which the respective regions of the subject have been optimized.

FIG. 8 shows one example of an image in which the vertical to horizontal ratio of the respective regions of the subject in FIG. 5 and the ratios between regions have been optimized.

Next, the control unit 11 composites a human image, in which the face region, the upper body region and the lower body region (or the torso region) have been connected, onto a background of the photographed image (step S306). The composite image from the completed region optimization is called a region-optimized image.

Next, the control unit 11 determines whether or not blank areas exist between the background and the human image in the composite image (step S307). If there are regions of the body that have become smaller than those in the originally photographed human image, there will be blank areas between these regions and the background image in the composite image. If it is determined that these blank areas exist (YES in step S307), then the control unit 11 interpolates the blank areas with pixel values of the pixels in the background adjacent to the blank areas in (step S308), and then transitions to step S4 in FIG. 3. If it is determined that these blank areas do not exist (NO in step S307), then the control unit 11 transitions to step S4 in FIG. 3.

In step S4 in FIG. 3, the control unit 11 calculates a processing level for the region optimization process (step S4).

The processing level is a value indicating how much respective regions are enlarged or shrunk to reach the corresponding target ratio thereof, or namely, how far the respective regions are from their corresponding target ratio. On the basis of the target ratios stored in the target ratio storage unit 152, the control unit 11 calculates the vertical length of the respective regions when the target vertical length of the respective regions is 1 (the target vertical length of the respective regions when the vertical width of the face region is 1), and then calculates the difference (absolute value) between the calculated value and 1 (the target vertical width of the respective regions). In a manner similar for the horizontal width of the respective regions, the control unit 11 calculates the horizontal length of the respective regions when the target horizontal length of the respective regions is 1 (the target horizontal length of the respective parts when the vertical length of the face region is 1), and then calculates the difference between the respective calculated values and 1 (the target horizontal width of the respective regions). The differences between the vertical width and the horizontal width of the respective regions and the targets are added together, and the processing level is calculated on the basis of this sum.

If the vertical widths of the face region, the upper body region, and the lower body region are respectively 1, 0.8, and 1.3 when the ideal vertical width is 1, for example, then the differences of these with respect to the ideal would be 0, 0.2, and 0.3, respectively, for a total of 0.5. If the horizontal widths of the face region, the upper body region, and the lower body region are respectively 1.1, 1.0, and 0.9 when the ideal horizontal width is 1, for example, then the differences of these with respect to the ideal would be 0.1, 0, and 0.1, respectively, for a total of 0.2. The sum of the differences between vertical width and horizontal width with respect to the ideal would be 0.7. The processing level is calculated by multiplying this difference by 10, for example.

When the calculation of the processing level ends, the control unit 11 causes the generated region-optimized image and processing level to be displayed on the display unit 13 (step S5) and ends the region-optimized image generation process.

As described above, the region-optimized image is an image in which a subject obtained by photography has been divided into a face region, an upper body region and a lower body region (or a face region and a torso region), and these respective regions have been corrected by the enlarging or shrinking thereof such that the vertical to horizontal ratio of the respective regions and the ratios of the size between the respective regions match ideal target ratios. Accordingly, it is possible to provide an image in which the physique of the subject has become an ideal balance, thereby allowing the user to enjoy an image that now shows an ideal physique. The processing level is displayed along with the region-optimized image, and thus the user can also enjoy being able to know how close (or far) the physique of the subject is from the target.

Modification Example 1

In the embodiment described above, an example was described in which the physique of a subject in a photographed image is corrected so as to match an ideal physique, but the present invention is also applicable to a scenario in which an image of a person to be projected onto a screen is created in a digital signage device that projects human images onto human-shaped screens using a projector.

In this digital signage device, the screen is formed in the shape of a human, but there is a problem that the image of the photographed subject does not fit the shape of the screen due to the physique of the subject when projected onto the screen. As a countermeasure, a signage mode or the like that creates an image for projection to the digital signage device may be provided in an imaging device 1, for example, and a signage mode key may be provided on the operation unit 12, and a projection image generation process may be executed by the control unit 11 when the operation unit 12 instructs a transition to the signage mode.

The flow of the projection image generation process is the same as the region-optimization process described in the embodiment above. The target ratio storage unit 152 of the storage unit 15, however, needs to store vertical width to horizontal width ratios and ratios of the sizes between the regions, as target ratios of the respective regions, for each region of the screen to be used for projection. In the projection image generation process, in step S302 in FIG. 6, the ratios of vertical width to horizontal width in the respective regions and the ratios of the sizes between the regions of the subject in the photographed image are corrected in accordance with the ratios of the respective regions on the screen. The vertical to horizontal ratio of the respective regions and the ratios of the sizes between the regions can be found by: illuminating a screen used for projection from behind, or capturing a screen using the imaging unit 14 in a state in which an image for screen recognition (a prescribed color or gradation image, for example) is projected; recognizing the shape of the screen through an imaging process in the control unit 11 on the basis of the obtained photograph image; and, on the basis of the recognized image, calculating (measuring) the vertical width and horizontal width of the respective regions on the screen to find a ratio in which the vertical width of the face region is 1. If the shape of the torso region on the recognized screen is divided into the upper body and the lower body, then the vertical width ratio of when there is a single torso region is inferred from the calculated values (measured values) of the vertical width and horizontal width of the upper body region and the lower body region, If there is no distinction between upper body and lower body of the torso region on the screen, then this information is stored in the storage unit 15 and the region-optimization process is performed on the torso region without dividing this torso region of the subject in the photographed image into an upper body region and a lower body region in the region dividing process.

Modification Example 2

In the embodiment described above, an example was described in which the boundary of the face region, torso region, upper body region, and lower body region of the subject in a photographed image are recognized by analyzing the photographed image and then dividing the subject in the photographed image into a face region, upper body region and lower body region (or a face region and torso region), but a touch panel that detects operation on a display panel of the display unit 13 may be provided, and frames corresponding to the face region, upper body region, and lower body region (or frames corresponding to the face region and torso region) acquired by the imaging unit 14 during half shutter may be displayed on the display unit 13, and the user may then operate these frames on the touch panel to designate the boundaries of the respective regions, for example. The control unit 11 may divide the photographed image into respective regions on the basis of the boundaries of the respective regions that have been designated on the touch panel. In this manner, it is possible for the user to perform region division at desired locations.

As described above, according to the imaging device 1, the control unit 11 divides a subject in a photographed image into a plurality of regions, corrects the sizes of the respective regions such that a ratio of vertical width to horizontal width of the respective divided regions and ratios of sizes between the respective reaches match prescribed target ratios. The control unit 11 then generates a region-optimized image by connecting the plurality of corrected regions.

Accordingly, the present invention makes it possible to provide an image in which the physique of the subject in the photographed image has become an ideal physique. The user can enjoy viewing a physique that is now a target physique.

When the face region and the torso region of the subject have been recognized in a photographed image, and a boundary line of clothes that vertically divide the recognized torso region within a prescribed range are detected, the control unit 11 recognizes the region above this boundary line on this torso region as the upper body region, and the region below this boundary line as the lower body region, and the control unit 11 then divides the subject in the photographed image into a face region, an upper body region, and a lower body region, for example. If a boundary line of clothes is not detected within a prescribed range on the recognized torso region, the control unit 11 divides the subject in the photographed image into a face region and a torso region, for example. Accordingly, it is possible to prevent the same regions having different clothes from being divided and thus producing an unnatural image.

The control unit 11 divides the subject in the photographed image into a face region, an upper body region, and a lower body region, or a face region and a torso region, in accordance with designated operation by the operation unit 12, for example. Accordingly, the user can perform region division at described locations.

The control unit 11 connects the upper body region to the lower body region, and sets the horizontal length of the center of a first connected region within a prescribed vertical range from a reference location of the connected portion of the upper body region and the lower body region as a prescribed value determined on the basis of the length of the top of the first connecting region and the length of the bottom, or an average value thereof, for example. The outline shape of both left-right sides of the first connecting region are corrected such that respective quadratic curves are drawn from the corresponding left-right ends of the center to the top of the corresponding left-right sides of the first connecting region and to the bottom of the corresponding left-right sides of the first connecting region and to the bottom. Accordingly, it is possible to connect the upper body region and the lower body region without any deviations in size.

The control unit 11 connects the face region to the upper body region or torso region, and sets the horizontal length of the center of a second connected region within a prescribed vertical range from a reference location of the connected portion of the face region and upper body region or torso region as a prescribed value determined on the basis of the length of the top of the second connecting region and the length of the bottom, or an average value thereof, for example. The outline shape of both left-right sides of the second connecting region are corrected such that quadratic curves are drawn from the both left-right ends of the center to the top of the same left-right sides of the second connecting region and to the bottom of the same left-right sides of the second connecting region and to the bottom, for example. Accordingly, it is possible to connect the face region to the upper body region or the torso region without any deviations in size.

The control unit 11 connects the face region to the upper body region or the torso region, and sets the second connecting region as a region that is within a prescribed vertical range from a reference location on the connected area of the face region and the upper body region or the torso region. The control unit 11 corrects the outline shape of both left-side sides of the second connecting region such that quadratic curves are drawn from the left-right ends below the face region to the bottom of the same left-right sides below the second connecting region, thereby making it possible for the face region and the upper body region or the torso region to be connected more naturally, for example.

By outputting an image of the subject in which a plurality of the regions have been corrected and joined together, it is possible for the user to view an image in which the subject has a target physique.

By calculating the processing level on the basis of the vertical width and horizontal width and target ratios for the respective divided regions and then outputting this processing level, it is possible for the user to know how close (or far) the subject is from the target physique.

By compositing the image of the subject in which a plurality of the corrected regions have been joined together onto the background in the photographed image and then interpolating the blank areas between the subject and the background in the composited image with the pixels in the background image adjacent to the subject, it is possible to make these blank areas blend into the background by using a color that is close to the background, if such blank areas have occurred between the background and the subject due to the compositing.

The content described in the embodiment above is one preferable example of an imaging processing device of the present invention, but the present invention is not limited to this.

In the embodiment described above, an example is described in which a model mode is provided, and the target ratio is a ratio of an ideal physique, such as that of a model, but the present invention is not limited to this, and a middle-aged mode or the like may be provided, for example, and the target ratio may be that of a middle-aged slightly plump physique, such that the physique of the subject is corrected so as to be slightly plump. In this manner, the user can obtain images in which the subject has a variety of physiques, thereby making it possible to provide the user with even more enjoyment.

In the present embodiment, an example is described in which there is one type of target ratio, but target ratios may be provided based on age and gender. A method of recognizing age or gender of the subject in the photographic image may be provided, and a region-optimization process may be performed on the basis of target values in accordance with the age or gender of the subject recognized in the photographed image. The recognition of age or gender of the subject in the photographed image can be performed using a well-known image processing technique.

In the embodiment described above, an example was described in which the imaging processing device of the present invention is applied to the imaging device 1, but the present invention is not limited to this. The image processing device of the present invention may be applied to a personal computer, smartphone, mobile terminal, or the like, for example.

In the embodiment described above, an example was described in which the region-optimized image generated in the region-optimized image generation process is displayed on the display unit 13, but the method of outputting the region-optimized image is not limited to this, and may be a printer or the like, for example.

In the embodiment described above, the subject of the photographed image was described as a human, but the present invention is not limited to this, and the subject may be a character or the like, for example.

Other detailed configurations and detailed operations of the respective devices constituting the imaging device can also be appropriately modified without departing from the spirit of the invention.

Several embodiments of the present invention were described, but the scope of the present invention is not limited to these, and includes the scope of the invention as described in the claims and the equivalents thereto.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An image processing device, comprising a control unit configured to:
   receive a photographed image;
   divide a subject in the photographed image into a plurality of regions;
   correct a size of each of the divided regions such that a ratio of vertical width to horizontal width in each of said regions and ratios of areas between the divided regions respectively match corresponding prescribed target ratios; and
   connect the divided regions, the sizes of which have been corrected,
   wherein, in dividing the subject in the photographed image into the plurality of regions, the control unit is configured to:
     recognize a face region and a torso region of the subject in the photographed image;
     attempt to detect, within a prescribed vertical range, a boundary line of clothes that vertically divides the recognized torso region;
     when the boundary line is detected, recognize a region above said boundary line on the torso region as an upper body region and a region below said boundary line on the torso region as a lower body region; and divide the subject in the photographed image into the face region, the upper body region, and the lower body region, and wherein, in connecting the divided regions, the control unit is configured to:

when the divided regions include the upper body region and the lower body region, connect the upper body region to the lower body region and designate a first connected region within a prescribed vertical range from a point at which the upper body region and the lower body region are connected;

set a horizontal length of a center of the first connected region to a value determined in accordance with a horizontal length of a top of the first connected region and a horizontal length of a bottom of the first connected region; and correct an outline shape on both left-right sides of the first connected region such that respective quadratic curves are drawn from both left-right ends of the center of the first connected region to corresponding left-right sides of a top of the first connected region and to corresponding left-right sides of a bottom of the first connected region.

2. The image processing device according to claim 1, wherein, when the boundary line of clothes that vertically divides the recognized torso region is not detected, the control unit divides the subject in the photographed image into the face region and the torso region.

3. An image processing device, comprising:
a control unit configured to:
receive a photographed image;
divide a subject in the photographed image into a plurality of regions;
correct a size of each of the divided regions such that a ratio of vertical width to horizontal width in each of said regions and ratios of areas between the divided regions respectively match corresponding prescribed target ratios; and
connect the divided regions, the sizes of which have been corrected;
a display unit that displays the photographed image; and
an operation unit that receives and interprets user instructions from a user to indicate a face region, an upper body region, and a lower body region of the subject, or the face region and a torso region of the subject, in the displayed photographed image,
wherein, in dividing the subject in the photographed image into said plurality of regions, the control unit divides the subject in the photographed image into the face region, the upper body region, and the lower body region, or the face region and the torso region, in accordance with said user instructions, and
wherein, in connecting the divided regions, the control unit is configured to:
when the divided regions include the upper body region and the lower body region, connect the upper body region to the lower body region and designate a first connected region within a prescribed vertical range from a point at which the upper body region and the lower body region are connected;
set a horizontal length of a center of the first connected region to a value determined in accordance with a horizontal length of a top of the first connected region and a horizontal length of a bottom of the first connected region; and
correct an outline shape on both left-right sides of the first connected region such that respective quadratic curves are drawn from both left-right ends of the center of the first connected region to corresponding left-right sides of a top of the first connected region and to corresponding left-right sides of a bottom of the first connected region.

4. An image processing device, comprising a control unit configured to:
receive a photographed image;
divide a subject in the photographed image into a plurality of regions;
correct a size of each of the divided regions such that a ratio of vertical width to horizontal width in each of said regions and ratios of areas between the divided regions respectively match corresponding prescribed target ratios; and
connect the divided regions, the sizes of which have been corrected,
wherein, in dividing the subject in the photographed image into the plurality of regions, the control unit is configured to:
recognize a face region and a torso region of the subject in the photographed image;
attempt to detect, within a prescribed vertical range, a boundary line of clothes that vertically divides the recognized torso region;
when the boundary line is detected, recognize a region above said boundary line on the torso region as an upper body region and a region below said boundary line on the torso region as a lower body region; and
divide the subject in the photographed image into the face region, the upper body region, and the lower body region, and
wherein, in connecting the divided regions, the control unit is configured to:
connect the face region to the upper body region or the torso region and designate a second connected region within a prescribed vertical range from a point at which the face region and the upper body region or the torso region are connected;
set a horizontal length of a center of the second connected region to a value determined in accordance with a horizontal length of a top of the second connected region and a horizontal length of a bottom of the second connected region; and
correct an outline shape on both left-right sides of the second connected region such that respective quadratic curves are drawn from both left-right ends of the center of the second connected region to a neck base on both corresponding left-right sides of the face region and to a bottom of both corresponding left-right sides of the second connected region.

5. An image processing device, comprising:
a control unit configured to:
receive a photographed image;
divide a subject in the photographed image into a plurality of regions;
correct a size of each of the divided regions such that a ratio of vertical width to horizontal width in each of said regions and ratios of areas between the divided regions respectively match corresponding prescribed target ratios; and
connect the divided regions, the sizes of which have been corrected;
a display unit that displays the photographed image; and
an operation unit that receives and interprets user instructions from a user to indicate a face region, an upper body region, and a lower body region of the subject, or the face region and a torso region of the subject, in the displayed photographed image, wherein, in dividing the subject in the photographed image into said plurality of regions, the control unit divides the subject in the photographed image into the face region, the upper body region, and the lower body region, or the face region and the torso region, in accordance with said user instructions, and wherein, in connecting the divided regions, the control unit is configured to:

connect the face region to the upper body region or the torso region and designate a second connected region within a prescribed vertical range from a point at which the face region and the upper body region or the torso region are connected;

set a horizontal length of a center of the second connected region to a value determined in accordance with a horizontal length of a top of the second connected region and a horizontal length of a bottom of the second connected region; and correct an outline shape on both left-right sides of the second connected region such that respective quadratic curves are drawn from both left-right ends of the center of the second connected region to a neck base on both corresponding left-right sides of the face region and to a bottom of both corresponding left-right sides of the second connected region.

6. The image processing device according to claim 1, wherein, in connecting the divided regions, the control unit is configured to:

connect the face region to the upper body region or the torso region and designate a second connected region within a prescribed vertical range from a point at which the face region and the upper body region or the torso region are connected;

set a horizontal length of a center of the second connected region to a value determined in accordance with a horizontal length of a top of the second connected region and a horizontal length of a bottom of the second connected region; and correct an outline shape on both left-right sides of the second connected region such that respective quadratic curves are drawn from both left-right ends of the center of the second connected region to a neck base on both corresponding left-right sides of the face region and to a bottom of both corresponding left-right sides of the second connected region.

7. The image processing device according to claim 2, wherein, in connecting the divided regions, the control unit is configured to:

connect the face region to the upper body region or the torso region and designate a second connected region within a prescribed vertical range from a point at which the face region and the upper body region or the torso region are connected;

set a horizontal length of a center of the second connected region to a value determined in accordance with a horizontal length of a top of the second connected region and a horizontal length of a bottom of the second connected region; and correct an outline shape on both left-right sides of the second connected region such that respective quadratic curves are drawn from both left-right ends of the center of the second connected region to a neck base on both corresponding left-right sides of the face region and to a bottom of both corresponding left-right sides of the second connected region.

8. The image processing device according to claim 3, wherein, in connecting the divided regions, the control unit is configured to:

connect the face region to the upper body region or the torso region and designate a second connected region within a prescribed vertical range from a point at which the face region and the upper body region or the torso region are connected;

set a horizontal length of a center of the second connected region to a value determined in accordance with a horizontal length of a top of the second connected region and a horizontal length of a bottom of the second connected region; and correct an outline shape on both left-right sides of the second connected region such that respective quadratic curves are drawn from both left-right ends of the center of the second connected region to a neck base on both corresponding left-right sides of the face region and to a bottom of both corresponding left-right sides of the second connected region.

9. The image processing device according to claim 1, wherein said value that is determined is an average value of the horizontal length of the top and the horizontal length of the bottom.

10. The image processing device according to claim 4, wherein said value that is determined is an average value of the horizontal length of the top and the horizontal length of the bottom.

11. An image processing device, comprising a control unit configured to:

receive a photographed image;

divide a subject in the photographed image into a plurality of regions;

correct a size of each of the divided regions such that a ratio of vertical width to horizontal width in each of said regions and ratios of areas between the divided regions respectively match corresponding prescribed target ratios; and connect the divided regions, the sizes of which have been corrected, wherein, in dividing the subject in the photographed image into the plurality of regions, the control unit is configured to:

recognize a face region and a torso region of the subject in the photographed image;

attempt to detect, within a prescribed vertical range, a boundary line of clothes that vertically divides the recognized torso region;

when the boundary line is detected, recognize a region above said boundary line on the torso region as an upper body region and a region below said boundary line on the torso region as a lower body region; and divide the subject in the photographed image into the face region, the upper body region, and the lower body region, wherein, in connecting the divided regions, the control unit connects the face region and the upper body region, or the face region and the torso region, and designates a second connected region within a prescribed vertical range from a point at which the face region and the upper body region, or the face region and the torso region, are connected, and wherein the control unit corrects an outline shape on both left-right sides of the second connected region such that respective quadratic curves are drawn from left-right ends at a bottom of the face region to both corresponding left-right sides at a bottom of the second connected region.

12. The image processing device according to claim 1, further comprising an output unit that outputs a subject image having the corrected regions that are connected together.

13. The image processing device according to claim 12,
    wherein the control unit is further configured to calculate a processing level indicating a degree of processing when the vertical width and horizontal width of the respective divided regions are corrected with respect to the respective target ratios, and
    wherein the output unit outputs the processing level.

14. The image processing device according to claim 1, wherein the control unit is further configured to:
    composite a subject image having the corrected regions that are connected together onto a background in the photographed image, and
    fill empty areas between the background and the subject image in the composited image with pixels in the background adjacent to the subject image.

15. The image processing device according to claim 4, wherein, when the boundary line of clothes that vertically divides the recognized torso region is not detected, the control unit divides the subject in the photographed image into the face region and the torso region.

16. The image processing device according to claim 4, further comprising an output unit that outputs a subject image having the corrected regions that are connected together.

17. The image processing device according to claim 16,
    wherein the control unit is further configured to calculate a processing level indicating a degree of processing when the vertical width and horizontal width of the respective divided regions are corrected with respect to the respective target ratios, and
    wherein the output unit outputs the processing level.

18. The image processing device according to claim 4, wherein the control unit is further configured to:
    composite a subject image having the corrected regions that are connected together onto a background in the photographed image, and
    fill empty areas between the background and the subject image in the composited image with pixels in the background adjacent to the subject image.

* * * * *